UNITED STATES PATENT OFFICE.

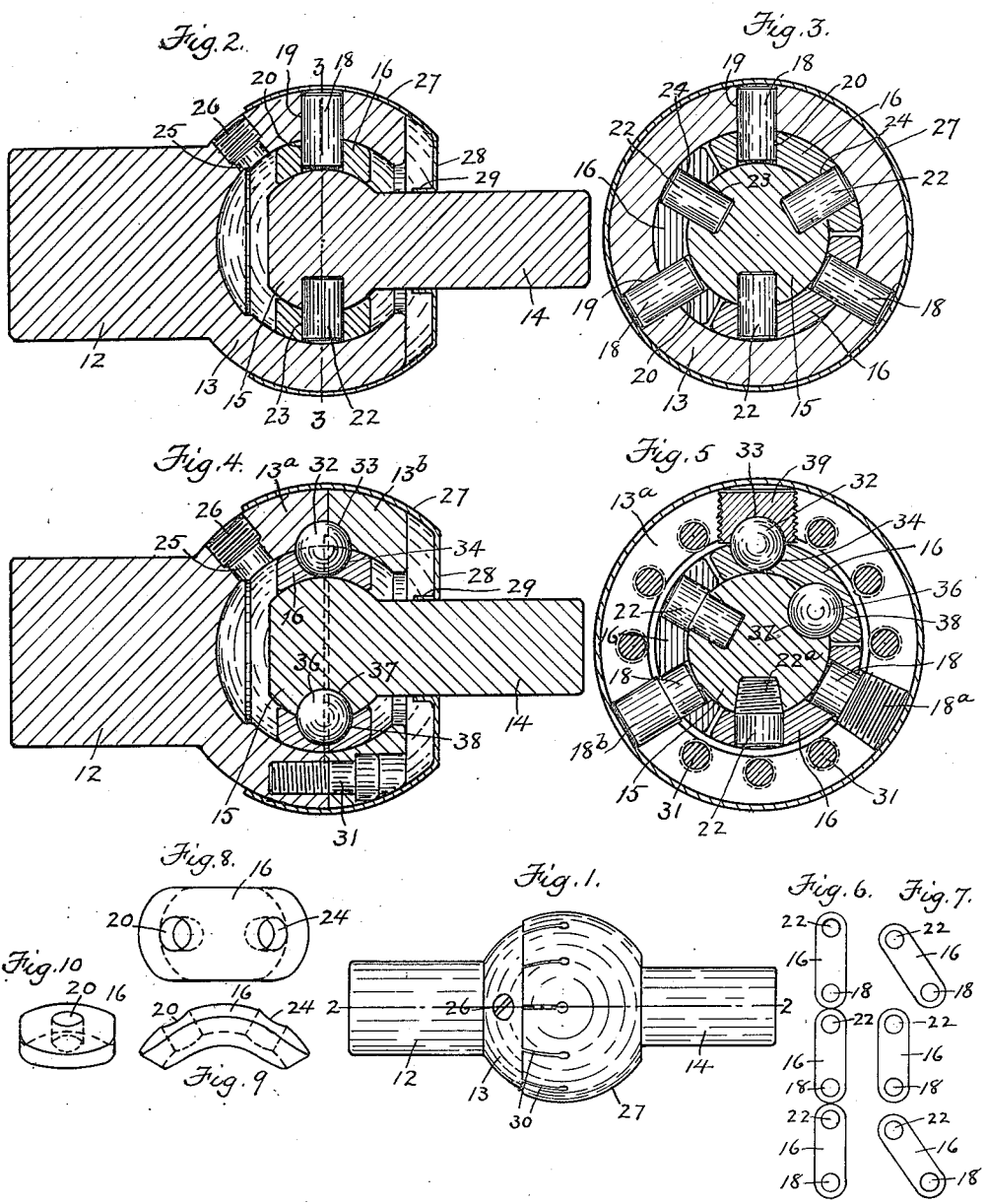

HANS WANDERS, OF BOSTON, MASSACHUSETTS.

UNIVERSAL JOINT.

1,272,740.  Specification of Letters Patent.  Patented July 16, 1918.

Application filed April 21, 1917. Serial No. 163,589.

*To all whom it may concern:*

Be it known that I, HANS WANDERS, a subject of the Emperor of Germany, residing at Boston, in the county of Suffolk and State of Massachusetts, have invented new and useful Improvements in Universal Joints, of which the following is a specification.

This invention relates to a universal joint for transmitting torque from one shaft to another, the axes of said shafts being either in or out of alinement with each other, and it has for its object to provide an improved joint adapted to transmit rotary motion from one shaft to the other at a uniform rate or velocity, whether the shafts be in or out of alinement, the rate of transmitted movement being unaffected by changes in the relative positions of the shafts.
The invention is embodied in the improvements which I will now proceed to describe and claim.

Of the accompanying drawings forming a part of this specification,—
Figure 1 is a plan view of two shafts or shaft portions connected by a joint embodying the invention.

Fig. 2 is a section on line 2—2 of Fig. 1.

Fig. 3 is a section on line 3—3 of Fig. 2.
Fig. 4 is a view similar to Fig. 2, showing a different embodiment of the invention.

Fig. 5 is a view similar to Fig. 3, showing an embodiment of the invention resembling in certain respects that shown by Fig. 4, and differing from the latter in certain details.

Fig. 6 is a developed plan view of the torque-transmitting links hereinafter referred to, as arranged when the shafts are in alinement with each other.

Fig. 7 is a view similar to Fig. 6, showing the links as arranged when the shafts are out of alinement with each other.

Figs. 8, 9 and 10 are, respectively, side, edge and end views of one of the links.

The same reference characters indicate the same parts in all of the figures.

In the drawings, 12 represents a shaft or shaft portion having a female member 13, the inner surface of which is concave and constitutes a zone of the internal surface of a hollow sphere.

14 represents another shaft or shaft portion having a male member 15, located within the member 13 and having an external surface which is convex and constitutes a zone of the external surface of a sphere.

16 represents a link interposed between the members 13 and 15, said link being of arcuate form and concavo convex, its convex outer surface conforming to the concave inner surface of the member 13, while its concave inner surface conforms to the convex outer surface of the member 15.

A pivotal connection is provided between one end portion of the link 16 and the female member 13, said connection being provided in the embodiment of the invention shown by Figs. 1, 2, 3, 8, 9 and 10 by a cylindrical stud 18 having a close driving fit in a radial socket 19 in the female member 13, the inner end of the stud having a relatively loose fit in a radial socket 20 formed for its reception in one end portion of the link. A pivotal connection is provided between the opposite end portion of the link and the male member 15, said connection, as shown by the figures last above mentioned, being provided by a stud 22 having a close driving fit in a socket 23 formed for its reception in the male member. The outer end of the stud has a relatively loose fit in a socket 24 in the opposite end portion of the link. When one of the shafts is driven, it communicates motion to the other shaft through the link 16, and the said pivotal connections between the link and the male and female members of the joint.

I prefer to provide a plurality of links 16, three being the number here shown, as shown by Fig. 3, although the invention may be embodied in a joint having either one link, or any other desired number, the series of links being concentric with the members 13 and 15.

When the axes of the shafts 12 and 14 are in alinement with each other, the studs 18 and 22 are in axial alinement with each other, or, in other words, are in a plane at right angles with the axes of the shafts. When the axes of the shafts are moved out of alinement with each other, the links are caused to swing or turn on the studs 18 and 22. The studs 18 and 22 are therefore in staggered relation to each other, as indicated by Fig. 7. The relative positions of the studs when the shaft axes are in alinement with each other, are shown by Fig.

6, Figs. 6 and 7 being diagrammatic views showing the series of links developed on a plane surface.

The said links and pivotal connections are adapted to communicate rotary motion from each shaft to the other, without variations or fluctuations of the movement imparted to the driven shaft, due to changes in the relative positions of the shafts.

It will be seen by reference to Figs. 2 and 4 that the convex outer surfaces of the links engage the concave inner surface of the female member, and the concave inner surfaces of the links engage the convex outer surface of the male member, in such manner as to resist end thrust, or, in other words, to prevent endwise movement of either of the shafts relatively to the other. The large areas of said concave and convex surfaces so distribute pressure tending to cause end thrust, that no appreciable wear of said surfaces and of the studs 18 and 22 is caused by such pressure.

In other universal joints of which I am aware, there is more or less wear due to end thrust. This is an objection which is entirely overcome by my invention. The link or links and pivotal connections constitute simple, durable and reliable connections between the male and female members of the joint. The opposite surfaces of the male and female members are separated by the space occupied by the links, parts of said space being vacant and adapted to receive a lubricant, which may be inserted through a lubricant inlet 25 provided with a closure 26.

To prevent the admission of dust into the space between the male and female members and to prevent the escape of lubricant from said space, I provide a dust-excluding and lubricant-retaining cap composed of a body 27, preferably of sheet metal, of substantially spherical form, adapted to embrace more than half of the spherical external surface of the female member 13 and to slip or move upon said surface, and a flange 28 having an opening surrounded by an annular lip 29, which embraces and closely fits the shaft 14. The cap is caused by the flange 28 to swing with the shaft 14 and slip on the member 13. The cap has a circular opening or mouth at its outer end of greater diameter than the shaft 12, so that the cap when swinging with the shaft 14 is not obstructed by the shaft 12. The said cap is provided with slots 30 (Fig. 1) which convert the zone of the cap containing said mouth into resilient fingers, rendering the mouth expansible, the cap being adapted to be forced by pressure on to the member 13 and to contract thereon.

The stud 18 may be provided with a screw-threaded enlargement 18$^a$ adapted to engage an internally threaded socket in the female member. The stud 22 may have a screw-threaded inner end portion 22$^a$ engaged with an internally threaded socket in the male member 15.

The female member may be composed of separable sections 13$^a$ and 13$^b$ connected by screws 31. Each of the meeting faces of said sections may be provided with a half socket, and said half sockets may be internally threaded to engage the thread of the enlargement 18$^a$, or said half sockets may be smooth, or without internal threads, to engage the outer end portion 18$^b$ of the stud 18. In either case, the tightening of the screws 31 causes the sections 13$^a$, 13$^b$ to exert clamping pressure on the stud parts interposed between them.

The pivotal connections between the links and the male and female members may be provided by a ball 32 entering a hemispherical socket 33 formed in the female member, and a hemispherical socket 34 in a link 16, and a ball 36 entering a hemispherical socket 37 in the male member, and a hemispherical socket 38 in the opposite end portion of the link 16. The sockets 33 may be formed directly in the female member, as indicated by Fig. 4, or in a plug-shaped body 39, which may be externally screw-threaded and engaged with an internal thread in the female member, as indicated in the upper portion of Fig. 5.

I claim:

1. A universal joint comprising a shaft having an internally concave female member, a shaft having an externally convex male member, a torque-transmitting link interposed between said members, and having a concave external surface and a convex internal surface, a pivotal connection between one end portion of said link and the female member, and a pivotal connection between the opposite end portion of the link and the male member, the link being adapted to swing between said members.

2. A universal joint comprising a shaft having an internally concave female member, a shaft having an externally convex male member, a plurality of torque-transmitting links interposed between said members, each link having a concave internal surface and a convex external surface, conforming respectively to the external surface of the male member and to the internal surface of the female member, said links being concentric with the said members, pivotal connections between given end portions of said links and the female member, and pivotal connections between the opposite end portions of said links and the male member, said connections being substantially in alinement with each other when the axes of the shafts are alined, and in staggered relation to each other when said axes are out of alinement.

3. A universal joint comprising an internally concave and externally spherical female member, a shaft having an externally convex male member, and torque-transmitting connections interposed between said members, in combination with a dust-excluding cap comprising a substantially spherical body portion embracing and movable on the external surface of the female member, and having an expansible mouth adapted to be expanded by and to contract on said surface, and a flange embracing and movable with the shaft having the male member.

In testimony whereof I have affixed my signature.

HANS WANDERS.